INVENTOR.
EDWARD COLEY FOX
BY Morris L. Rabkin
ATTORNEY

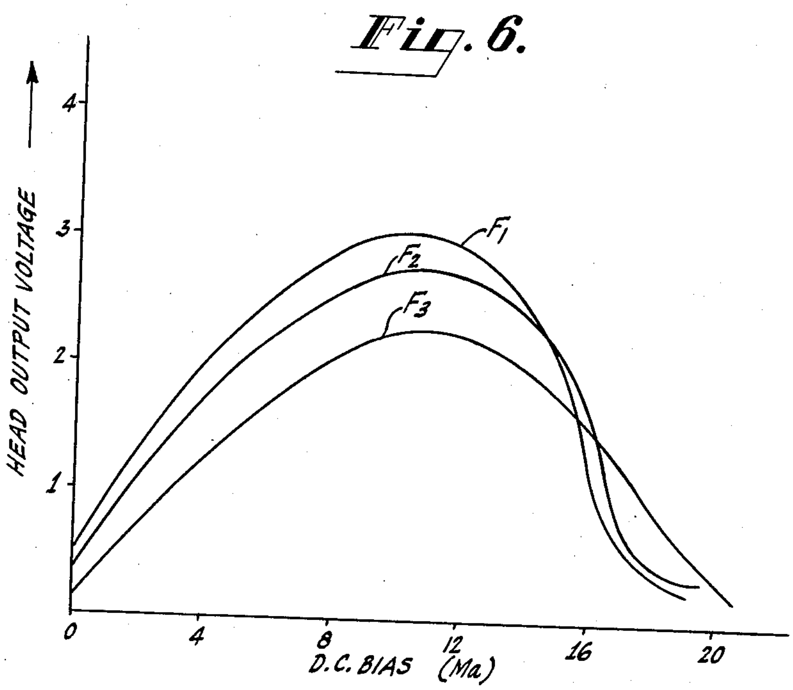
Fig. 8.
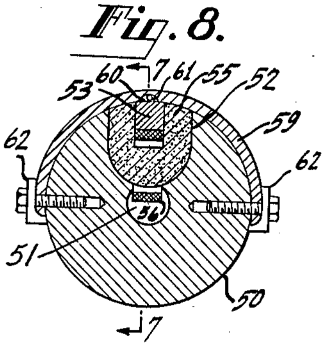
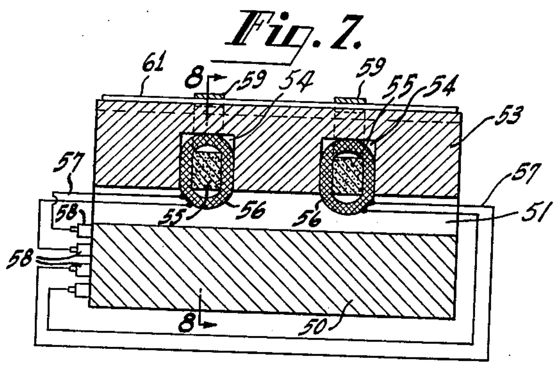
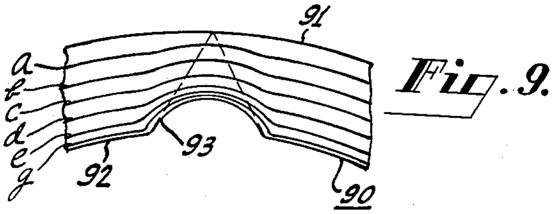
Fig. 9.
INVENTOR.
EDWARD COLEY FOX
BY Morris A. Rabkin
ATTORNEY

United States Patent Office 3,106,617
Patented Oct. 8, 1963

3,106,617
MAGNETIC RECORDING AND REPRODUCING HEAD

Edward C. Fox, Levittown, Pa., assignor to Radio Corporation of America, a corporation of Delaware Filed Dec. 24, 1958, Ser. No. 782,826
6 Claims. (Cl. 179—100.2)

The present invention relates to magnetic recording and reproducing, and more particularly to an improved transducer of the type generally referred to as a magnetic head for scanning a magnetic record to record or reproduce signals thereon.

Magnetic heads presently used in magnetic recording and reproducing equipment have a core of magnetic material with a coil wound thereon. The core is broken by a gap adapted to be located adjacent the magnetic record to be scanned. This gap is considered to be the most critical part of the magnetic head. It determines the recording field of magnetic flux which is established when signals to be recorded on the magnetic record are applied to the coil. The gap determines the characteristics of the head in deriving signals recorded on the magnetic record during playback, since it defines the means whereby magnetic flux on the tape may enter into the core to generate signals in the coil.

Accordingly, much effort has been expended in designing gap structures for magnetic heads. Many shapes have been proposed for the gap. Many structures for supporting the core have been provided having for their main purpose the precise location of the faces of the core which provide the gap. Because of the profound effect of the gap on the signal transducing characteristics of the magnetic head, this gap has been referred to as the signal gap of the magnetic head.

It is possible to design magnetic heads having physical signal gaps in accordance with modern techniques which will provide highly desirable and suitable signal transducing characteristics. Such magnetic heads are precision electronic components which require skilled personnel for their construction, and particularly for forming the signal gaps. It follows that magnetic heads having good signal transducing characteristics are of high cost.

It is a primary object of the present invention to provide an improved magnetic record transducer which, while possessing highly desirable signal transducing characteristics, is nevertheless more readily manufacturable and of lower cost than conventional magnetic heads.

Another important object of the present invention is to provide an improved magnetic record transducer having improved signal transducing characteristics over those heretofore attainable.

It is a further object of the present invention to provide a magnetic record transducer having a virtual signal gap, that is, one which is not an actual, physical gap but which effectively acts as a physical gap.

It is a still further object of the present invention to provide a magnetic record transducer having a core which is continuous thereby having no discontinuities in the core region adapted to be disposed adjacent the magnetic record to be scanned.

It is a still further object of the present invention to provide magnetic heads having virtual signal gaps for single and multi-track recording and reproducing applications which are readily manufacturable at low cost.

Briefly described, a magnetic record transducer or head constructed in accordance with the present invention includes a core of magnetic material which defines a path for magnetic flux continuous within the core through a region adjacent a record to be scanned, and having a virtual gap in said region. It is a feature of one embodiment of the invention to provide a constriction in the core in the region adapted to be disposed adjacent the magnetic record. The constriction defines a minute area of the core which is maintained in a state of magnetic saturation to thereby establish an effective signal gap which is termed a virtual signal gap herein.

The invention itself, both as to its organization and method of operation, as well as the foregoing and other objects and advantages thereof, will be more readily apparent from a reading of the following description and in connection with the accompanying drawings in which:

FIGURE 6 is a graph presenting a family of curves showing another operating characteristic of a magnetic head constructed in accordance with the present invention;

FIGURE 7 is a sectional view of a multi-track magnetic head constructed in accordance with the present invention;

FIGURE 8 is a sectional view of the magnetic head shown in FIGURE 7, the section being taken along the line 8—8 of FIGURE 7; and FIGURE 9 is a fragmentary diagrammatic view showing the flux pattern adjacent the gap of a head constructed according to the present invention and referred to hereinafter in explaining the operation thereof.

Figure 1:
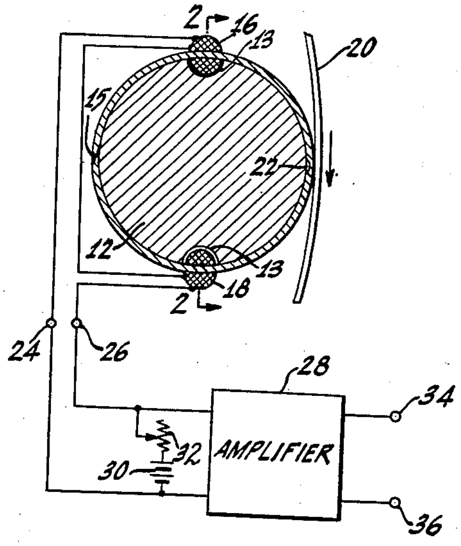
FIGURE 1 is a view, partly in a cross section through one form of a magnetic head constructed in accordance with the present invention and partly diagrammatic to show the head connected to associated circuitry.
Figure 2:
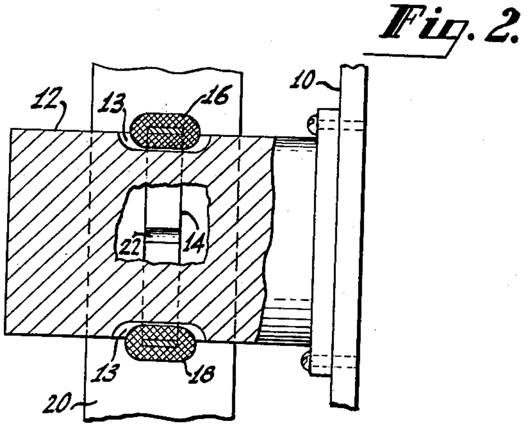
FIGURE 2 is a view, partially in cross section, taken along the line 2—2 of FIGURE 1.

Referring more particularly to FIGURES 1 and 2, there is shown a mounting panel 10 of a magnetic recording and reproducing apparatus on which a transducer according to the present invention is mounted. This panel 10 provides support for a stepped cylinder 12 of some non-magnetic material, such as aluminum or brass. The cylinder 12 is notched at two diametrically opopsite places 13 along its periphery. A body of magnetic material provided by a strip 14 forms the core of the magnetic record transducer which will be referred to hereinafter as a magnetic head. The strip 14 is disposed in a loop around the cylinder 12. The ends 15 of this strip 14 overlap one another and are squeezed together so as to tightly engage each other when the strip is disposed on the cylinder 12. Cement or some suitable clamping device (not shown) may be used to hold the strip 14 in place on the cylinder 12. A pair of coils 16 and 18 is wound around the strip 14. The coils fit into the notched regions 13 of the cylinder 12.

A magnetic record tape 20 is shown fragmentarily as passing over the strip 14. The outer surface of the strip 14 contacts the tape 20. The inner surface of the strip 14 has a small recess 22 therein opposite to the region where the tape is in contact with the outer surface of the strip 14. This recess may be formed by a grinding process or a photo etching process which will be described in connection with FIGURES 3 and 4, respectively. The recess may be no more than a scratch in the inner surface of the strip.

The coils 16 and 18 may be connected together in series humbucking relationship between a pair of terminals 24 and 26. An amplifier 28 may be connected to the terminals 24 and 26. A battery 30, which is illustrative of a source of direct current, is connected to one terminal 24 of the head and to a potentiometer 32. The arm of the potentiometer 32 is connected to the opposite terminal 26 of the head.

When the head is operated as a recording head, signals to be recorded are applied to the amplifier 28 at terminals 34 and 36. These terminals 34 and 36 are the input terminals of the amplifier. Alternating current recording bias voltage may be applied together with the signals across the terminals 34 and 36. These signals are amplified in the amplifier 28 and are applied to the coils 16 and 18. The coils 16 and 18 establish a magnetic flux in the strip 14 of magnetic material. The strip 14 of magnetic material is the core of the magnetic head and defines a path for the magnetic flux generated by the coils 16 and 18 within the confines of the core and through the region having the recess 22 therein.

Direct current from the battery 30 is adjusted in magnitude by the potentiometer 32 and passed through the coils 16 and 18 simultaneously with the signals and recording bias voltage. This direct current in the coils 16 and 18 establishes a direct current magnetic field within the core 14. This direct current magnetic field exists simultaneously with the alternating current magnetic field due to the signals and alternating current bias.

A virtual gap is formed in the core adjacent the recess 22. The formation of a virtual gap may be theoretically ascribed to the constriction in the core, which provides a constriction in the flux path within the core material. The direct current flux is believed to be primarily responsible for the creation of the gap. The flux lines become constricted in the region of the recess. Accordingly, the number of flux lines passing through the cross sectional area of the core at the recess is increased to a point where the core in this region is driven into a state of magnetic saturation. The permeability of the magnetic material in this minute, saturated region becomes approximately equal to 1. Since the permeability of an actual, physical gap provided by air or some non-magnetic material is also approximately equal to 1, it follows that a virtual gap is provided in the core adjacent the recess.

The core material suitable for the illustrated magnetic head desirably has the property of rapidly changing in reversible permeability from a high value of several thousand to approximately one for a flux density change which is relatively small. In other words, $\mu_r$, the reversible or alternating current permeability, should be approximately equal to $\mu_0$, the permeability of air, as the flux density through the cross sectional area at the recess changes slightly. In terms of a curve showing permeability with increasing flux density, the permeability should remain at a high value as the flux density increases and then drop to approximately one as the flux density further increases slightly.

In order to obtain the proper direct current flux density at the region around the recess 22, the potentiometer 32 may be adjusted to adjust the direct current flowing from the battery 30. Proper adjustment of the potentiometer may be obtained by making the adjustment while measuring the alternating current winding inductance of the coils 16 and 18. The curve shown in the graph of FIGURE 5 portrays the change in alternating current winding inductance with increasing direct current, referred to D.C. bias current, as would be obtained from the battery 30 through the potentiometer 32. By varying the current until it is observed that the alternating winding inductance decreases at a linear, gradual rate, a suitable direct current for bias will be obtained. The current should not be increased to a point where total saturation of the entire core results, as would be indicated by a rapidly descending and then leveling alternating current winding inductance. It may be observed from the graph of FIGURE 5 that there is a somewhat abrupt change in the alternating current winding inductance which occurs between the operating region and the region where total saturation of the core 16 takes place.

The following details of construction of a suitable magnetic head of the type shown in FIGURES 1 and 2 are presented solely for purposes of illustration: The core may comprise a strip of magnetic material identified by the trade name "4–79 Mo-Permalloy" and having dimensions of 0.7 inch by 0.04 inch in length and width, respectively, and a thickness of 2.3 mils. The recess 22 may be 0.8 mil in depth and 2.9 mils in length and preferably extends across the entire width of the strip. The coils 16 and 18 can be of 100 turns each. The winding current can be about 10 milliamperes.

A feature of the invention is that the direct current flux is at all times confined within the core 14 and does not leave the core to establish a direct current magnetic field externally thereof. Since no more than a negligible direct current external field is produced, the tape record is not erased. The invention therefore provides a magnetic head having a virtual gap therein and having direct current flux circulating through the gap without establishing a direct current erasing field at the tape. The alternating current signal and bias flux, on the other hand, fringes at the gap and establishes a recording flux field which penetrates the tape to record signals thereon as the tape passes over the gap region of the head.

The formation of a virtual signal gap in a magnetic head constructed in accordance with the invention may be better understood by reference to FIGURE 9. It should be appreciated, however, that the following discussion is solely for purposes of explanation, since the scope of the invention is not limited to the particular theory of operation.

A core 90, which is fragmentarily shown in FIGURE 9, has an outer surface 91 adapted to engage the tape and an inner surface 92. The inner surface has a recess 93 therein. A plurality of flux lines, *a – – – – – g*, are shown within the core to illustrate the magnetic field pattern. Over the recess 93, the flux lines are much closer to each other adjacent to the inner surface 92 than adjacent the outer surface 91 of the core because magnetic flux tends to deviate least from its lowest reluctance path. Thus, greatest flux crowding occurs near the recess providing the core constriction. The flux density will, therefore, be greatest within the core adjacent the recess. Magnetic saturation takes place when the flux density is greater than a predetermined flux density for the material. Therefore, the magnetic core is driven to magnetic saturation first adjacent to the recess 93. As the flux density in the core increases, the saturated region extends toward the outer surface 91 of the core. It follows that the saturated area adjacent the recess 93 will be greater than the saturated area at the outer surface 91. The saturated area, which can extend across the entire cross-section of the core at the recess, may take the tapered configuration defined by the dashed lines. Since the virtual signal gap is defined by the saturated core area, the virtual gap becomes very narrow adjacent the outer surface 91 which engages the magnetic record. Accordingly, a magnetic head having a virtual gap as provided by the invention, will have good frequency response attributable to a narrow gap.

In the playback, the direct current bias is adjusted to have a magnitude similar to that used in recording. A virtual gap is again established in the region adjacent to the recess 22. The gap is again theoretically believed to be formed due to the constriction of the flux field which produces saturation between the recess and the outer surface of the core 14. Signal flux from the tape enters the core 14 around the gap and passes through the core adjacent to the coils 16 and 18. The coils therefore generate an alternating current voltage which may be amplified. In order to amplify the alternating current signal voltage derived at the coils 16 and 18, the amplifier 28 may be switched so that the input and output thereof are reversed in accordance with known switching techniques. It may be mentioned that the amplifier 28 may contain conventional equalizing circuits to compensate for the response characteristics of the magnetic head.

FIGURE 6 is a graph showing the output voltage obtained from the head with varying direct current bias. A family of curves is shown, each obtained by using the head as a playback head to reproduce magnetic tape records having different constant frequency signals recorded thereon. All of the tape records are played back on a magnetic reproducer where the tape is driven at the same constant speed. Thus, the first curve, labeled $F_1$, was taken using a test magnetic tape having a signal of 1,000 cycles recorded thereon. The second curve, labeled $F_2$, was taken with a test magnetic tape having a signal of 3,000 cycles recorded thereon. The third curve, labeled $F_3$, was taken with a test tape having a frequency of 400 cycles recorded on the tape. It will be observed from the curves that the output voltage from the head is a maximum at approximately ten milliamperes direct current bias applied to the coils. The different output voltages for the different test tapes are due to the frequency response characteristics of the magnetic head.

Figures 3, 4, 5:
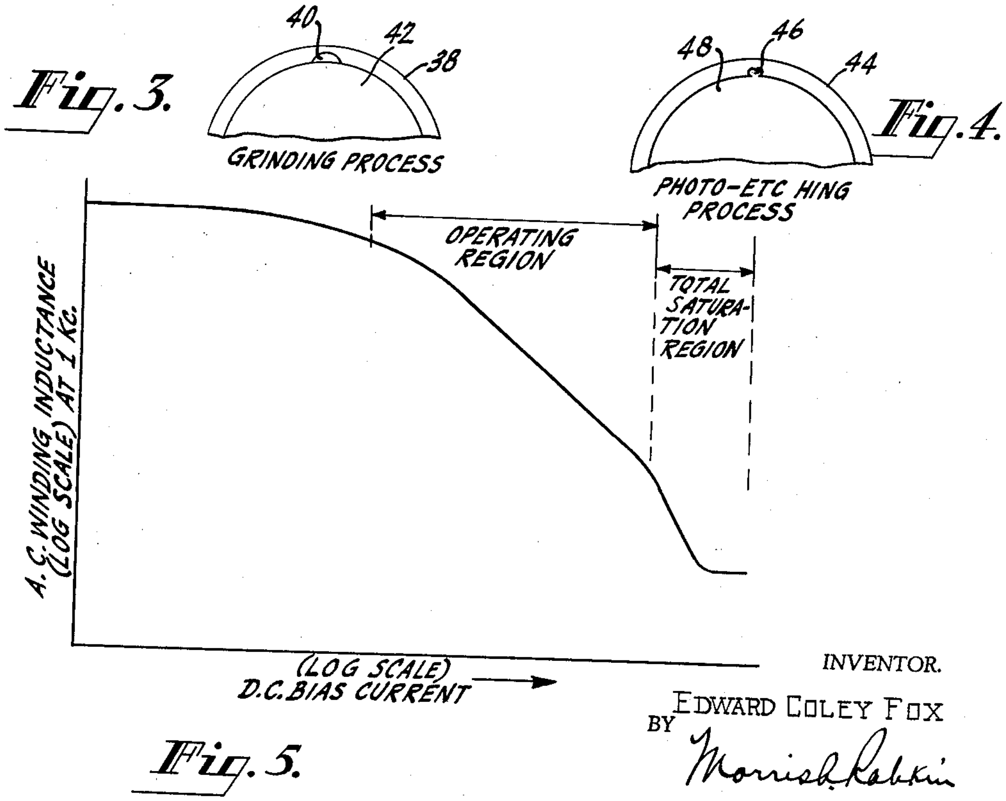
FIGURE 3 is a fragmentary, end view of a magnetic head constructed in accordance with another embodiment of the present invention.
FIGURE 4 is a fragmentary end view of a magnetic head constructed in accordance with still another embodiment of the present invention.
FIGURE 5 is a graph showing an operating characteristic of a magnetic head constructed in accordance with the present invention.

Referring, now, to FIGURE 3, an end view of a magnetic head having a virtual gap is shown. This head includes a core having a recess formed by a grinding process. In this view, a strip 38 of magnetic material defining the core and having a recess 40 therein is again shown wrapped around a cylindrical support 42. The recess 40 may be made as follows: A glass plate having a flat surface is cleaned. A fine wire is stretched across the plate and cemented thereto. The strip 38 is cemented to another glass plate, and the two glass plates are placed one on top of the other in a V-block or other suitable jig with a charge of fine abrasive therebetween. The slide supporting the wire is then moved across the slide supporting the strip 38 so that the wire fixed thereto grinds the recess into the core, due to the abrasive clinging to the wire. The ground recess 40 is therefore in the nature of a scratch because of its small size.

FIGURE 4 shows a recess formed by a photo-etching process. In FIGURE 4, a strip 44 providing the core and having a recess 46 therein is again disposed around a cylindrical support 48. The recess 46 is somewhat heart-shaped due to the action of the chemicals in the photo-etching process. In practicing the photo-etching process, the strip, before being placed around the cylindrical support 48, is coated with photo responsive material, such as an acid resist. "Kodak Photo-Resist" (KPR) may be suitable. A slide is made having a thin line inscribed thereon. Light is projected through the slide onto the photo responsive material so that the surface of the core and the photo responsive material are exposed except for the line. In this way, a fine line may be photographically projected on the surface of the core. The core is then emersed in a developer for "Photo-Resist" which washes away the resist which had not been exposed to light. The coated surface of the core is then again coated with a corrosive solution such as a ferric chloride solution which attacks the unexposed line and not the exposed photo responsive material. The solution then dissolves some of the core material to provide a recess of depth determined by the length of time the acid is allowed to remain upon the strip. Alternatively, an electro-etching both of phosphoric and sulphuric acid and water core having the resist coating thereon and a conductive plate are placed in the bath. A source of direct current is connected to the core and plate so as to polarize the core positively and plate negatively. The material of the core at the photographically unexposed line is therefore etched. A recess of considerable depth can be made in this manner.

Referring now to FIGURES 7 and 8, a magnetic head of the multi-track type is shown having a pair of head units each adapted to scan a different magnetic track on a magnetic tape record. Each of the head units is provided with a virtual gap. This multi-track head, of relatively simple construction as compared to conventional heads, is provided by a cylinder 50 of non-magnetic material, such as aluminum. This cylinder has a longitudinally extending hole 51 which is drilled along the axis thereof. A slot 52 is milled longitudinally into the cylinder to a depth where the hole 51 and the slot 52 communicate with each other. The slot 52 may alternatively be made by drilling from one end of the cylinder 50 with a drill of diameter approximately equal to the radius of the cylinder 50. A rod 53 having a diameter equal to the diameter of the slot 52 is inserted into the slot 52. This rod has a pair of U-shaped slots milled therein. These slots 54 are slightly enlarged adjacent to the hole 51 for a purpose shortly to be set forth. Cores 55 of magnetic material are inserted into the slots 54. These cores 55 may be of ferrite material. The cores are U-shaped to fit into the slots 54 and extend to the surface of the rod. Coils 56 wound around the bottom of the cores 55 fit into the enlarged portions of the slots 54. Leads 57 extending from these coils 56 may be brought out through the hole 51 to terminals 58 on one end of the cylinder 50.

Strips 59 of magnetic material having recesses 60 are provided. An alignment wire 61 of non-magnetic material is cemented to the top of the rod 53 and positioned on the surface of the rod between the ends of the U-shaped cores 55. This wire 61 extends along the rod 53 in a direction parallel to the axis of this rod. The strips 59 are then positioned around the surfaces of the cylinder 50 and the rod 53. The recesses 60 are located over the alignment wire 61 so that the recesses 60 on both of the cores 59 will be in alignment. The strips 59 will be seen to bridge the ends of the U-shaped cores 55 and therefore complete a magnetic circuit around the cores. The strips 59 are permanently fixed to the rods 50 by means of screw clamps 62, two clamps being provided for each strip 59.

A source of direct current bias and the output or input connections of amplifiers may be connected to the terminals 58 for operating each of the magnetic head units. A virtual gap is provided in each of the head units adjacent the recesses 60 therein.

From the foregoing description, it will be apparent that I have provided various forms of magnetic heads all of which are of simpler, more readily manufacturable and lower cost construction than conventional magnetic heads having physical signal gaps. Such heads have the distinct manufacturing advantage that they do not require careful pole surface finishing and assembly. By presenting a uniform, unbroken surface to the magnetic tape, wear of both the tape and the head is greatly reduced. Moreover, by reason of the extremely narrow, virtual gap afforded by such heads, they will yield good high frequency response. These and other advantages of my invention will undoubtedly be apparent to those skilled in the art, as will also the fact that various other forms of the invention are possible. Hence, I desire that the foregoing shall be taken in an illustrative, rather than in a limiting sense.

What is claimed is:

1. A magnetic head comprising a strip of magnetic material having a continuous region cooperable with a magnetic record disposed adjacent thereto, said strip having a recess in said region, a signal coil around said strip, and means for passing direct current through said coil for magnetically saturating said region with a unidirectional magnetic flux.

2. A magnetic head comprising a core of magnetic material having a continuous, uninterrupted, outer surface and an inner surface opposite to each other, said core having a recess in said inner surface which defines a constricted area between said inner and outer surfaces, a signal receiving coil coupled to said core, and means for applying to said coil concurrently with said signal a direct current of a magnitude sufficient to saturate said core in said constricted area so as to provide a virtual gap in said area.

3. A magnetic head for cooperation with a magnetic record and comprising a loop of magnetic material having an outer peripheral surface adapted to face said record in a region of said outer peripheral surface, said loop also having an inner peripheral surface, said outer peripheral surface being continuous and uninterrupted in said region, said loop having a recess extending inwardly from said inner peripheral surface thereof, said recess being opposite to said region, a signal receiving coil around said loop, and means for applying to said coil concurrently with said signal a direct current of a magnitude sufficient to saturate said loop between said recess and said outer peripheral surface to provide a virtual gap in said loop between said recess and said outer peripheral surface.

4. A magnetic head for cooperation with a magnetic record, said head comprising a body of magnetic material affording a continuous flux path and having a physically continuous uninterrupted portion at which said record can confront said head, said portion having a cross-sectional dimension at the point of confrontation with the record such that the flux density at said portion is different than the flux density in the remainder of said body solely by reason of said cross-sectional dimension, and means for applying a unidirectional saturating flux to said portion to thereby provide a virtual gap in said body at said point of confrontation.

5. A magnetic head for cooperation with a magnetic record movable with respect to said head along a prescribed path, said head comprising an endless body of magnetic material affording a continuous flux path and having a physically continuous uninterrupted portion at which said record can engage said head, said portion having a smaller cross-sectional dimension at the point of engagement with the record than the remainder of said body so that the flux density at said portion is different than the flux density in the remainder of said body solely by reason of said cross-sectional dimension and means for applying a unidirectional saturating flux to said portion to thereby provide a virtual gap in said body at the region of engagement of said record with said head.

6. A magnetic head comprising a core of magnetic material for establishing a flux path continuous within said core at a region adjacent a magnetic record cooperable therewith, said core having a physically constricted portion at said region, and means for effecting magnetic saturation of said core at said portion thereof to thereby establish a virtual gap along said path, said means including (1) a coil electromagnetically coupled to said core, and (2) means for passing direct current through said coil to establish said saturation.

References Cited in the file of this patent

UNITED STATES PATENTS

| | | |
|---|---|---|
| 2,536,260 | Burns | Jan. 2, 1951 |
| 2,676,392 | Buhrendorf | Apr. 27, 1954 |
| 2,879,340 | Starr | Mar. 24, 1959 |
| 2,882,347 | Kleis et al. | Apr. 14, 1959 |
| 2,915,597 | Wanlass et al. | Dec. 1, 1959 |
| 2,933,718 | Arsenault | Apr. 19, 1960 |
| 2,933,721 | Hagopian | Apr. 19, 1960 |
| 3,004,820 | Howden | Oct. 17, 1961 |
| 3,053,941 | Johnson | Sept. 11, 1962 |

FOREIGN PATENTS

| | | |
|---|---|---|
| 895,063 | Germany | Sept. 17, 1953 |